United States Patent
Yamaguchi et al.

(10) Patent No.: US 8,550,403 B2
(45) Date of Patent: Oct. 8, 2013

(54) AIRCRAFT FUEL TANK

(75) Inventors: Hiroaki Yamaguchi, Nagoya (JP); Yuichiro Kamino, Nagoya (JP); Tooru Hashigami, Nagoya (JP); Kazuyuki Oguri, Nagoya (JP); Koichi Nakamura, Nagoya (JP)

(73) Assignees: Mitsubishi Heavy Industries, Ltd., Tokyo (JP); The Society of Japanese Aerospace Companies, Tokyo (JP)

( * ) Notice: Subject to any disclaimer, the term of this patent is extended or adjusted under 35 U.S.C. 154(b) by 159 days.

(21) Appl. No.: 13/201,916

(22) PCT Filed: Mar. 26, 2010

(86) PCT No.: PCT/JP2010/055361
§ 371 (c)(1),
(2), (4) Date: Aug. 17, 2011

(87) PCT Pub. No.: WO2010/113793
PCT Pub. Date: Oct. 7, 2010

(65) Prior Publication Data
US 2011/0297790 A1 Dec. 8, 2011

(30) Foreign Application Priority Data
Mar. 30, 2009 (JP) .................................. 2009-083361

(51) Int. Cl.
*B64D 37/04* (2006.01)
(52) U.S. Cl.
USPC .................... 244/135 R; 244/135 B; 220/562
(58) Field of Classification Search
USPC .................. 244/123.14, 123.3, 123.5, 135 R, 244/135 B; 220/62.11, 562, 563, 581, 586, 220/592.2, 596.26; 206/0.6
See application file for complete search history.

(56) References Cited

U.S. PATENT DOCUMENTS

| 4,502,092 A | 2/1985 | Bannink, Jr. et al. |
| 2003/0218098 A1 | 11/2003 | Goto et al. |
| 2008/0137259 A1 | 6/2008 | Heeter et al. |

(Continued)

FOREIGN PATENT DOCUMENTS

| CN | 2658108 | 11/2004 |
| CN | 101312879 | 11/2008 |

(Continued)

OTHER PUBLICATIONS

Canadian Notice of Allowance issued Apr. 3, 2013 in corresponding Canadian Patent Application No. 2,752,581.

(Continued)

*Primary Examiner* — Timothy D Collins
*Assistant Examiner* — Nicholas McFall
(74) *Attorney, Agent, or Firm* — Wenderoth, Lind & Ponack, L.L.P.

(57) ABSTRACT

An aircraft fuel tank capable of suppressing electrostatic charging caused, for example, by flow electrification with the fuel. The aircraft fuel tank comprises an upper skin (5) and a lower skin (7) that exhibit conductivity and form a portion of a container for storing fuel, an internal structure (19) formed from a metal, and an inner surface layer (15) which has semiconductor properties or insulating properties and is formed in an integral manner on the inner surfaces of the upper skin (5) and the lower skin (7) in a location where the internal structure (19) contacts the upper skin (5) and the lower skin (7), and in the surrounding portion thereof, wherein the inner surface layer (15) is formed, at least in the surrounding portion, from a material having semiconductor properties.

2 Claims, 2 Drawing Sheets

(56) References Cited

U.S. PATENT DOCUMENTS

| | | |
|---|---|---|
| 2008/0297967 A1 | 12/2008 | Winter et al. |
| 2008/0302545 A1 | 12/2008 | Kulesha |
| 2008/0308678 A1 | 12/2008 | Purdy et al. |

FOREIGN PATENT DOCUMENTS

| | | |
|---|---|---|
| DE | 3128581 | 2/1983 |
| JP | 7-33089 | 2/1995 |
| JP | 7-172395 | 7/1995 |
| JP | 2003-226296 | 8/2003 |
| RU | 2092396 | 10/1997 |
| WO | 2006/069996 | 7/2006 |

OTHER PUBLICATIONS

Japanese Decision to Grant a Patent issued Aug. 28, 2012 in corresponding Japanese Patent Application No. 2009-083361 with explanation of relevance.

International Search Report issued Jun. 15, 2010 in International (PCT) Application No. PCT/JP2010/055361.

"9.3.5 Imparting Conductivity" in Electrostatic Handbook, pp. 287-289, The Institute of Electrostatics Japan, Ohmsha, 2006 w/English translation.

Chinese Office Action issued May 27, 2013 in corresponding Chinese Patent Application No. 201080012955.9 with English translation.

Russian Decision on Patent Grant issued Jan. 28, 2013 in corresponding Russian Patent Application No. 2011138846 with English translation.

AIRCRAFT FUEL TANK

The present application is a national stage entry of International Application No. PCT/JP2010/055361, filed 26 Mar. 2010, published in Japanese, which claims priority from Japanese Patent Application No. 2009-083361, filed on 30 Mar. 2009, the disclosures of which are incorporated herein by reference.

TECHNICAL FIELD

The present invention relates to an aircraft fuel tank.

BACKGROUND ART

In recent years, almost all aircraft fuel tanks are so-called integral tanks such as those described in Patent Literature 1, wherein the airframe structure itself forms the tank container. In one example of an integral tank, the region enclosed by the front spar, the rear spar, and the upper and lower wing skins, which represent sections of the main wing, is used as a tank. In other words, these structures are used as a container for storing fuel.

On the other hand, materials that are lightweight, high-strength and provide good durability are in demand for the airframe materials such as the main wing of the aircraft, and in recent years, the use of resin materials that have been reinforced with fiber (composite materials) has become more widespread.

For example, carbon fiber reinforced plastics (CFRP) prepared by immobilizing carbon fibers within an epoxy resin or the like are widely used as these composite materials.

CITATION LIST

Patent Literature

{PTL 1} Japanese Unexamined Patent Application, Publication No. 2003-226296

SUMMARY OF INVENTION

Technical Problem

In those cases where a CFRP is used for the skins of the main wing, if, for example, an aluminum alloy is used for internal structures, then the difference in the normal electrode potentials of the two materials causes a galvanic current to flow through the portions of contact between the CFRP and the aluminum alloy, causing galvanic corrosion of the aluminum alloy.

In order to prevent this problem, a technique has been proposed wherein a layer of an insulator such as a glass fiber reinforced plastic (GFRP), prepared by immobilizing glass fibers within an epoxy resin or the like, is formed on the inner surface of the skins in those locations where the skins contact internal structures formed from aluminum alloy and in the portions surrounding those contact locations. Further, due to its strength, CFRP tends to be prone to burr generation when subjected to drilling, but by laminating a GFRP to the CFRP, burr generation can be suppressed.

However, because the inner surfaces of the skins contact the fuel, if these inner surfaces are formed from an insulator such as GFRP, then an electrical charge generated by flow electrification between the GFRP and the fuel tends to accumulate on the GFRP. As a result, the danger of an electrostatic discharge acting as an ignition source for the fuel cannot be ignored.

The present invention has been developed in light of the above circumstances, and has an object of providing an aircraft fuel tank that is capable of suppressing electrostatic charging caused, for example, by flow electrification generated by the fuel, while also suppressing galvanic corrosion of internal structures.

Solution to Problem

In order to achieve the object described above, the present invention adopts the aspects described below.

The present invention provides an aircraft fuel tank comprising an skin that exhibits conductivity and forms a portion of a container for storing fuel, an internal structure formed from a metal, and an inner surface layer which has semiconductor properties or insulating properties and is formed in an integral manner on the inner surface of the skin in a location where the skin contacts the internal structure and in a surrounding portion thereof, wherein the inner surface layer is formed, at least in the surrounding portion, from a material having semiconductor properties.

According to the present invention, because the inner surface layer which has semiconductor properties or insulating properties is formed in an integral manner on the inner surface of the skin in those locations where the skin contacts the internal structure and in surrounding portions thereof, the inner surface layer, which has semiconductor properties or insulating properties and is therefore more resistant to electricity flow than a conductor, is interposed between the skin and the internal structure which exhibit conductivity. As a result, galvanic current flow between the skin and the internal structure is suppressed, meaning galvanic corrosion of the internal structure can be suppressed.

Further, within the inner surface layer, those locations that contact the internal structure do not contact the fuel, but the portions surrounding those contact locations do contact the fuel. In the present invention, because at least the surrounding portion is formed from a material having semiconductor properties, electricity flows through this surrounding portion more readily than an insulator. Accordingly, even if flow electrification occurs as a result of the surrounding portion making contact with flowing fuel, because electricity flows through the surrounding portion more readily than an insulator, any electrical charge that accumulates due to the flow electrification with the fuel can be readily diffused. As a result, electrostatic discharges that can act as an ignition source for the fuel can be suppressed.

Furthermore, in order to improve workability, the entire inner surface layer may be formed using a material having semiconductor properties. In this case, even if the fuel were to permeate into a location that makes contacts with the internal structure and cause contact electrification, that electrification could be readily diffused.

Moreover, the burrs that tend to occur when a carbon fiber reinforced plastic (CFRP) that is used as the skin is subjected to processing such as drilling can be suppressed by the inner surface layer.

A semiconductor such as a silicon carbide (SiC)-based semiconductor, germanium-based semiconductor, gallium arsenide (GaAs)-based semiconductor, gallium arsenide phosphorus-based semiconductor, or gallium nitride (GaN)-based semiconductor can be used as the material having semiconductor properties. Furthermore, fibers having semiconductor properties that have been prepared by subjecting any of various insulating inorganic fibers or organic fibers to a slight conductive treatment, such as the incorporation of a conductive powder or the performing of a surface conductivity treatment, may also be used.

In the present invention, the above material preferably has a volume resistivity of $1\times10^0$ to $1\times10^{10}$ Ω·cm.

If the volume resistivity of the material is less than $1\times10^0$ Ω·cm, then an electric current flows readily through the material, and the danger of galvanic corrosion of the internal structure increases. On the other hand, if the volume resistivity of the material is greater than $1\times10^{10}$ Ω·cm, then the diffusion of static electricity becomes inadequate, and for example, the charge potential of the inner surface layer may increase, increasing the danger of an electrostatic discharge.

In terms of improving safety, the minimum value for the volume resistivity is preferably not less than $1\times10^2$ Ω·cm, and a value of not less than $1\times10^4$ Ω·cm is even safer.

Advantageous Effects of Invention

According to the present invention, an inner surface layer which has semiconductor properties or insulating properties is formed in an integral manner on the inner surface of the skin in those locations where the skin contacts an internal structure formed from metal and in surrounding portions thereof, and therefore the flow of a galvanic current between the skin and the internal structure is suppressed, and galvanic corrosion of the internal structure can be suppressed.

Further, within the inner surface layer, at least the surrounding portion that makes contact with the fuel is formed from a material having semiconductor properties, and therefore any electrical charge that accumulates due to flow electrification caused by the fuel can be readily diffused. As a result, electrostatic discharges that can act as an ignition source for the fuel can be suppressed.

DESCRIPTION OF EMBODIMENTS

Figure 1:
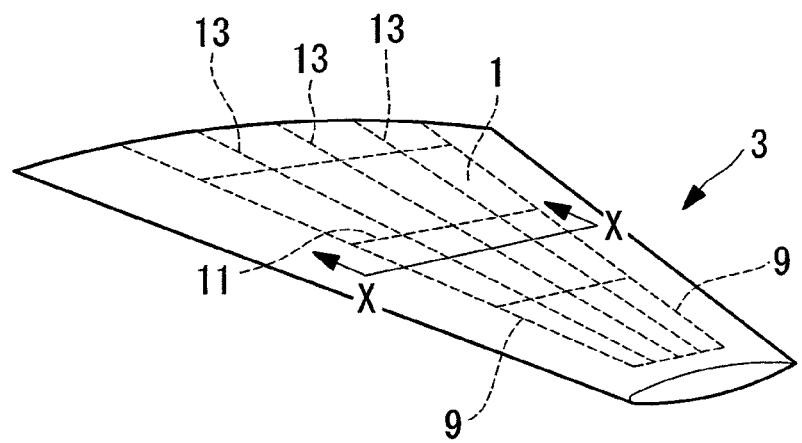
FIG. 1 A perspective view illustrating a main wing according to an embodiment of the present invention.
Figure 2:
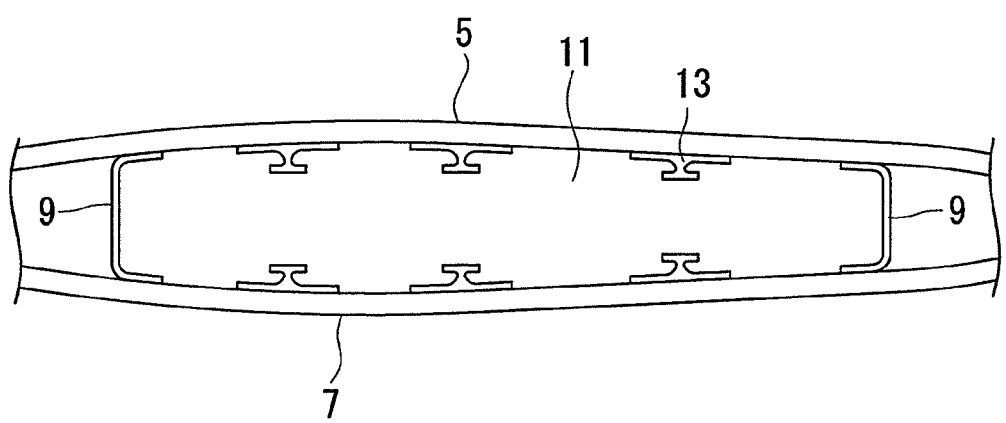
FIG. 2 A cross-sectional view along the line X-X in FIG. 1.
Figure 3:
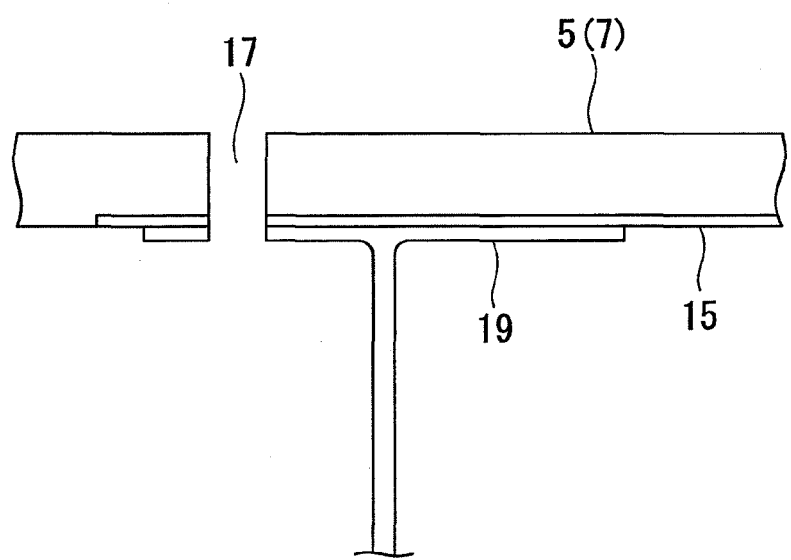
FIG. 3 A cross-sectional view illustrating an enlargement of a portion of the upper skin or lower skin according to an embodiment of the present invention.

A fuel tank 1 according to an embodiment of the present invention is described below with reference to FIG. 1 to FIG. 3.

The fuel tank 1 is an integral tank that utilizes structural members of the aircraft itself, and is provided inside a main wing 3.

The wing shape of the main wing 3 is formed by an upper skin (skin) 5 and a lower skin (skin) 7. In order to maintain strength, internal structures 19 are disposed vertically and horizontally between the upper skin 5 and the lower skin 7. These internal structures 19 include a plurality of spars 9 extending along the lengthwise direction of the wing, a plurality of ribs 11 that extend in a direction that intersects the spars, stringers 13 that extend along the lengthwise direction of the wing in the same manner as the spars 9, and connecting members (shear ties). A portion of these internal structures 19 are formed, for example, from a metal such as an aluminum alloy. Further, other members are formed partially from metal or formed entirely from a fiber reinforced plastic such as a CFRP.

The fuel tank 1 is compartmentalized top and bottom by the upper skin 5 and the lower skin 7, and is compartmentalized front and rear by the front and rear spars 9. The fuel tank 1 is partitioned and divided into a number of sections by the ribs 11.

The upper skin 5 and the lower skin 7 are formed from a CFRP that has conductive properties. As illustrated in FIG. 3, in those locations on the inner surfaces of the upper skin 5 and the lower skin 7 (on the inside of the fuel tank 1) where the skins contact internal structures 19 formed from metal, and in the portions surrounding those contact locations, an inner surface layer 15 having semiconductor properties is formed in an integral manner.

Because the actual location where the internal structure 19 makes contact is covered by the internal structure 19, it does not contact the fuel. Accordingly, there is no danger of flow electrification occurring due to contact with the fuel, and therefore this contact portion may be formed from an insulator such as a GFRP.

The inner surface layer 15 is formed from an epoxy resin that uses, for example, a silicon carbide (SiC)-based semiconductor such as Tyranno fiber (a registered trademark) as the reinforcing material.

The inner surface layer 15 is formed, for example, using a prepreg in which a woven fabric of Tyranno fiber (a registered trademark) is impregnated with an epoxy resin, wherein this prepreg is integrated with the upper skin 5 and the lower skin 7, and then cured.

Alternatively, for example, a woven fabric of Tyranno fiber (a registered trademark) may be formed in an integral manner, together with an epoxy-based film adhesive, on the upper skin 5 and the lower skin 7, and then cured.

The volume resistivity of the Tyranno fiber (a registered trademark) used in the inner surface layer 15 is, for example, $1\times10^6$ Ω·cm.

The volume resistivity of the inner surface layer 15 is selected appropriately within a range from $1\times10^0$ to $1\times10^{10}$ Ω·cm.

This semiconductor is not limited to silicon carbide (SiC)-based semiconductors, and germanium-based semiconductors, gallium arsenide (GaAs)-based semiconductors, gallium arsenide phosphorus-based semiconductors, and gallium nitride (GaN)-based semiconductors and the like may also be used. Further, fibers having semiconductor properties that have been prepared by subjecting any of various insulating inorganic fibers or organic fibers to a slight conductive treatment, such as the incorporation of a conductive powder or the performing of a surface conductivity treatment, may also be used.

The fuel tank 1 having the type of structure described above has the following actions and effects.

Because the inner surface layer 15 having semiconductor properties is provided on the inner surfaces of the upper skin 5 and the lower skin 7 in those locations where the skins contact the metal internal structures 19, and in the surrounding portions thereof, electricity flows through the inner surface layer more readily that an insulator such as a GFRP. Consequently, even if electrostatic charging occurs within these portions due to flow electrification between the upper skin 5 and the lower skin 7 and the fuel, any electrical charge that accumulates on the inner surfaces of the upper skin 5 and the lower skin 7 can be readily diffused through the inner surface layer 15.

As a result, electrostatic discharges that can act as an ignition source for the fuel can be suppressed.

Moreover, because the inner surface layer 15 having semiconductor properties exists between the upper skin 5 and lower skin 7 that have conductive properties and the metal internal structures 19, and also in the surrounding portions, galvanic current flow between the upper skin 5 and lower skin 7 and these internal structures 19 is restricted compared to the current flow between two conductors. By suppressing the galvanic current flow between the upper skin 5 and lower skin 7 and these internal structures 19, galvanic corrosion of the internal structures 19 can be suppressed.

At this time, the volume resistivity of the inner surface layer 15 is selected appropriately within a range from $1\times10^0$ to $1\times10^{10}$ Ω·cm. If the volume resistivity of the inner surface layer 15 is less than $1\times10^0$ Ω·cm, then an electric current flows readily through the layer, and the danger of galvanic corrosion of the metal internal structures 19 increases. On the other hand, if the volume resistivity of the inner surface layer 15 is greater than $1\times10^{10}$ Ω·cm, then the diffusion of static electricity becomes inadequate, and for example, the charge potential of the inner surface layer 15 may increase, increasing the danger of an electrostatic discharge.

As mentioned above, within the inner surface layer 15, those locations where the internal structures 19 make contact, and which therefore do not contact the fuel, may be formed from a material having insulating properties such as a GFRP.

In this case, galvanic current flow between those portions of the upper skin 5 and lower skin 7 and the internal structures 19 for which there is no danger of contact electrification with the fuel is suppressed even further, enabling galvanic corrosion of the internal structures 19 to be better suppressed.

The internal structures 19 are fastened to the upper skin 5 and the lower skin 7 using fasteners formed from metal, such as rivets. Accordingly, through-holes 17 through which the shank portions of the fasteners are inserted are formed in the upper skin 5, the lower skin 7 and the internal structures 19.

At this time, because the upper skin 5 and the lower skin 7 are formed from a CFRP, burrs tend to be formed during production of the through-holes 17, but the inner surface layer 15 can suppress the occurrence of these burrs.

The present invention is not limited by the embodiment described above, and appropriate modifications can be made without departing from the scope of the present invention.

REFERENCE SIGNS LIST

1 Fuel tank
3 Main wing
5 Upper skin
7 Lower skin
9 Spar
11 Rib
13 Stringer
15 Inner surface layer
17 Through-hole
19 Internal structure

The invention claimed is:

1. An aircraft fuel tank comprising:
a skin that exhibits conductivity and forms a portion of a container for storing fuel;
an internal structure formed from a metal; and
an inner surface layer that is formed in an integral manner with an inner surface of the skin at a location between the skin and the internal structure and at an area surrounding the location, wherein
at least a portion of the inner surface layer has electrical properties of a semiconductor, the portion of the inner surface layer being formed at least at the area surrounding the location.

2. The aircraft fuel tank according to claim 1, wherein the portion of the inner surface layer having the electrical properties of a semiconductor has a volume resistivity of $1\times10^0$ to $1\times10^{10}$ Ω·cm.

* * * * *